(12) United States Patent
Scheible et al.

(10) Patent No.: US 6,791,447 B2
(45) Date of Patent: Sep. 14, 2004

(54) CONFIGURATION FOR PRODUCING ELECTRICAL POWER FROM A MAGNETIC FIELD

(75) Inventors: Guntram Scheible, Hirschberg (DE); Kai Garrels, Mannheim (DE)

(73) Assignee: ABB Research Ltd., Zurich (CH)

( * ) Notice: Subject to any disclaimer, the term of this patent is extended or adjusted under 35 U.S.C. 154(b) by 0 days.

(21) Appl. No.: 10/237,382

(22) Filed: Sep. 9, 2002

(65) Prior Publication Data

US 2003/0062980 A1 Apr. 3, 2003

Related U.S. Application Data

(63) Continuation of application No. PCT/EP01/01866, filed on Feb. 20, 2001.

(30) Foreign Application Priority Data

Mar. 9, 2000 (DE) .......................................... 100 11 501
Nov. 9, 2000 (DE) .......................................... 100 55 404

(51) Int. Cl.[7] ............................................. H01F 17/04
(52) U.S. Cl. ........................ 336/221; 336/214; 336/170
(58) Field of Search ........................ 336/170, 180–184, 336/212, 214, 215, 221–222, 225, 230; 323/229, 370, 355, 361; 363/15–17, 20, 21.02

(56) References Cited

U.S. PATENT DOCUMENTS

| | | | |
|---|---|---|---|
| 4,788,987 A | | 12/1988 | Nickel |
| 5,047,715 A | * | 9/1991 | Morgenstern .......... 324/207.17 |
| 5,712,772 A | * | 1/1998 | Telefus et al. ........... 363/21.02 |
| 5,751,205 A | * | 5/1998 | Goseberg .................... 336/178 |

FOREIGN PATENT DOCUMENTS

| | | |
|---|---|---|
| DE | 39 22 556 A1 | 1/1991 |
| DE | 197 20 465 A1 | 11/1998 |
| DE | 199 26 799 A1 | 12/2000 |
| GB | 1 595 108 | 8/1981 |

* cited by examiner

Primary Examiner—Tuyen T. Nguyen
(74) Attorney, Agent, or Firm—Laurence A. Greenberg; Werner H. Stemer; Ralph E. Locher

(57) ABSTRACT

A configuration for producing electrical power from a magnetic field includes a three-dimensional winding configuration formed from a central core of a magnetic material on which at least three windings are fitted. The windings have winding axes each disposed at right angles to one another and intersecting at a common point. Each of the windings is connected to a rectifier. Each of the windings is, preferably, connected to a resonant capacitor to form a resonant circuit.

15 Claims, 3 Drawing Sheets

CONFIGURATION FOR PRODUCING ELECTRICAL POWER FROM A MAGNETIC FIELD

This is a continuation of application Ser. No. PCT/EP01/01866, filed Feb. 20, 2001.

BACKGROUND OF THE INVENTION

Field of the Invention

The invention relates to a configuration for producing electrical power from a magnetic field. The invention may be used, for example, for feeding power to sensors.

German Patent DE 39 22 556 C3 discloses a configuration for non-contacting power and sensor signal transmission having an RF transmitter for setting up an unmodulated magnetic radio-frequency field through a transmission coil, in which a transponder receives the radio-frequency magnetic field and uses it to supply itself with power. The sensor and transponder are supplied with the power obtained from the magnetic field.

SUMMARY OF THE INVENTION

It is accordingly an object of the invention to provide a configuration for producing electrical power from a magnetic field that overcomes the hereinafore-mentioned disadvantages of the heretofore-known devices of this general type and that provides a highly effective configuration for producing electrical power from a magnetic field.

With the foregoing and other objects in view, there is provided, in accordance with the invention, a configuration for producing electrical power from a magnetic field, including a three-dimensional winding configuration having a central core of a magnetic material, at least three windings fitted on the central core, the at least three windings having at least three winding axes disposed at right angles to one another and intersecting at a common point, a rectifier, a resonant capacitor, the at least three windings connected to the rectifier, and the at least three windings connected to the resonant capacitor to form a resonant circuit.

With the objects of the invention in view, there is also provided a configuration for producing electrical power from a magnetic field, including a three-dimensional winding configuration having a central core of a magnetic material, at least three windings fitted on the central core, the at least three windings having at least three winding axes disposed at right angles to one another and intersecting at a common point, at least three rectifiers each respectively connected to one of the at least three windings, and at least three resonant capacitors each respectively connected to one of the at least three windings to form a resonant circuit.

With the objects of the invention in view, there is also provided a configuration for producing electrical power from a magnetic field, including a three-dimensional winding configuration having a central core of a magnetic material, three windings fitted on the central core, the three windings having three winding axes disposed at right angles to one another and intersecting at a common point, three rectifiers each respectively connected to one of the three windings, and three resonant capacitors each respectively connected to one of the three windings to form a resonant circuit.

The advantages achieved by the invention include, in particular, that the three-dimensional winding configuration does not require any specific alignment as a function of a magnetic field used for supplying power. The three-dimensional winding configuration is, in fact, always optimally aligned with the magnetic field "automatically" in all possible positions, thus, allowing optimum reception and optimum utilization of energy.

The proposed three-dimensional winding configuration is particularly suitable for a configuration, which is proposed in German Published, Non-Prosecuted Patent Application DE 199 26 799 A1, for supplying a large number of sensors with electrical power without the use of wires, using at least one primary winding (primary coil, transmission coil) fed from a medium-frequency oscillator, and with each sensor having at least one secondary winding (secondary coil, receiving coil) suitable for receiving energy from a medium-frequency magnetic field (band from approximately 15 kHz to approximately 15 MHz). The secondary windings so required can be provided very well by the three-dimensional winding configuration according to the invention. The advantage of the alignment process, which is always "automatically" optimum, with the magnetic field is particularly important for sensors (proximity sensors) mounted on moving machine components.

In accordance with another feature of the invention, the at least three windings are connected to the resonant capacitor to form a series resonant circuit.

In accordance with a further feature of the invention, the at least three resonant capacitors are each respectively connected to one of the at least three windings to form a series resonant circuit.

In accordance with an added feature of the invention, the at least three windings are connected to the resonant capacitor to form a parallel resonant circuit.

In accordance with an additional feature of the invention, the at least three resonant capacitors are each respectively connected to one of the at least three windings to form a parallel resonant circuit.

In accordance with yet another feature of the invention, the rectifiers each have DC connections and the DC connections of the rectifiers are connected in series.

In accordance with yet a further feature of the invention, the rectifiers each have DC connections and the DC connections of the rectifiers are connected in parallel.

In accordance with yet an added feature of the invention, the windings are transformer windings.

In accordance with yet an additional feature of the invention, the central core is a cubic core.

In accordance with again another feature of the invention, the cubic core has slots holding the windings.

In accordance with again a further feature of the invention, the central core is a spherical core.

In accordance with again an added feature of the invention, the spherical core has slots holding the windings.

In accordance with again an additional feature of the invention, the central core has three limbs each disposed at right angles with respect to one another and at least one of the windings is fitted on each of the three limbs.

In accordance with a concomitant feature of the invention, the three limbs have longitudinal axes, the longitudinal axes intersect at a central point in the central core, and two of the windings are fitted symmetrically with respect to the central point on each of the three limbs.

Other features that are considered as characteristic for the invention are set forth in the appended claims.

Although the invention is illustrated and described herein as embodied in a configuration for producing electrical power from a magnetic field, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
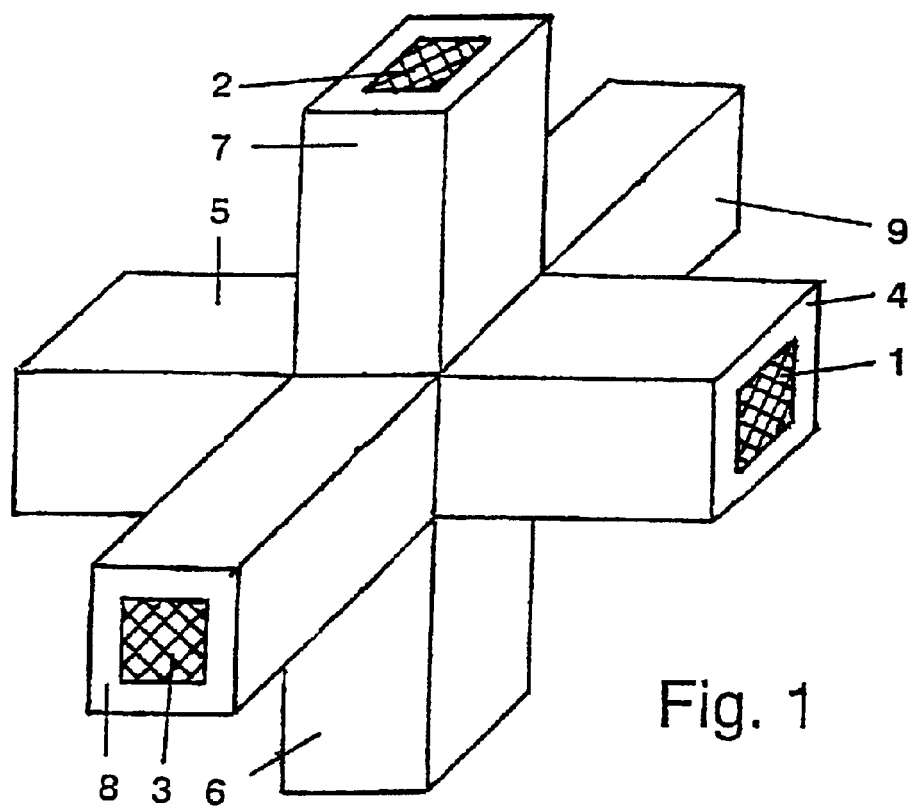
FIG. 1 is a perspective view of a first embodiment of a three-dimensional winding configuration according to the invention.

Referring now to the figures of the drawings in detail and first, particularly to FIG. 1 thereof, there is shown a first embodiment of a three-dimensional winding configuration. There is, in FIG. 1, a symmetrically constructed core having three limbs 1, 2, 3 each disposed at right angles to one another, with the longitudinal axes of the three limbs 1, 2, 3 intersecting at a central point in the core, and with two windings 4, 5; 6, 7; 8, 9 being fitted symmetrically with respect to the central intersection point on each limb 1, 2, 3, respectively. Consequently, the winding axes of the windings 4 to 9 are each disposed at right angles to one another and intersect at a point that is, at the same time, the central point of the core. The core is formed from a magnetic material.

Figure 2:
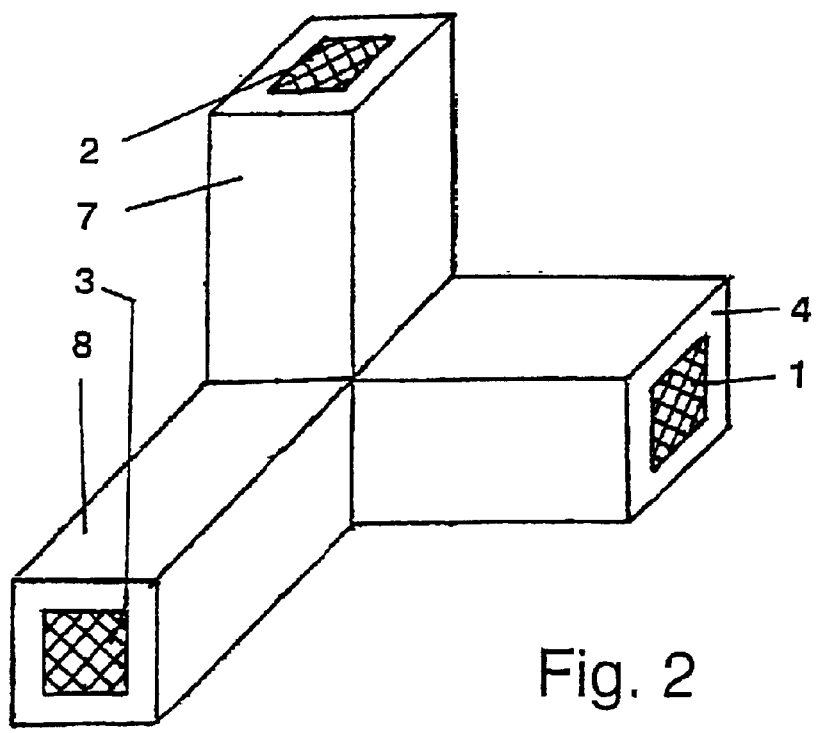
FIG. 2 is a perspective view of a second embodiment of the winding configuration of FIG. 1.

FIG. 2 shows a second embodiment of a three-dimensional winding configuration illustrating an asymmetrically constructed core composed of three limbs 1, 2, 3 each disposed at right angles to one another, with the longitudinal axes of the three limbs 1, 2, 3 intersecting at a point on the edge of the core, and with a winding 4, 7, 8 being fitted to each limb 1, 2, 3, respectively. The winding axes of the windings 4, 7, 8 are each disposed at right angles to one another and intersect at a point that is, at the same time, the above-mentioned point at the edge of the core.

Figure 3:
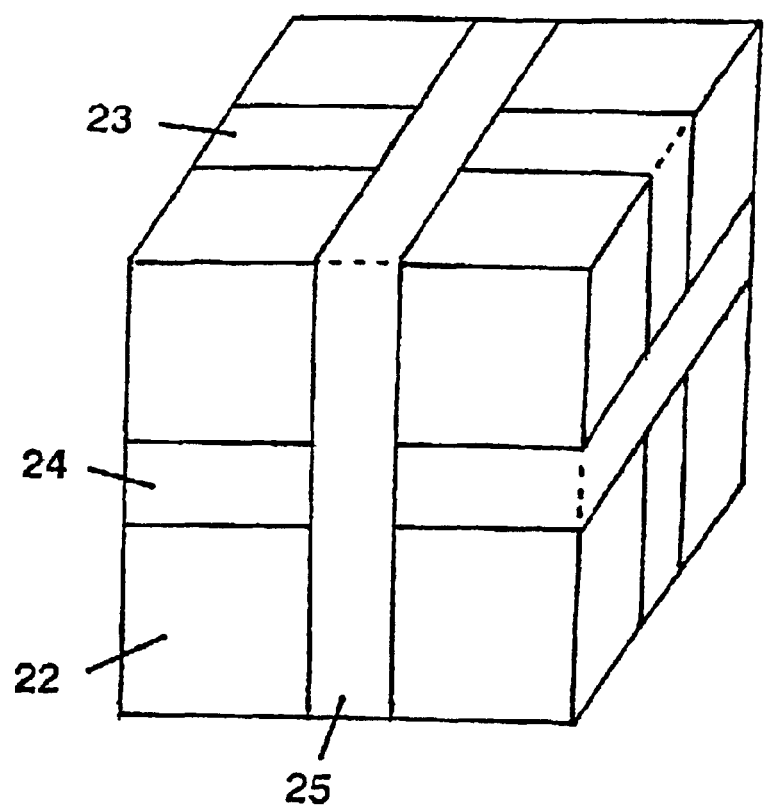
FIG. 3 is a perspective view of a third embodiment of the winding configuration of FIG. 1.

FIG. 3 shows a third embodiment of a three-dimensional winding configuration illustrating a cubic core 22, on which three windings 23, 24, 25 are fitted. The winding axes of the windings 23 to 25 are each disposed at right angles to one another and intersect at a central point in the core 22. The advantage of the embodiment of FIG. 3 is that it can be produced easily and cost-effectively. The core 22 can be provided with appropriate slots to hold the windings 23 to 25, but it is also possible for the windings 23, 24, 25 to be fitted directly on the core 22.

A spherical configuration of the core is, of course, also feasible.

Figure 4:
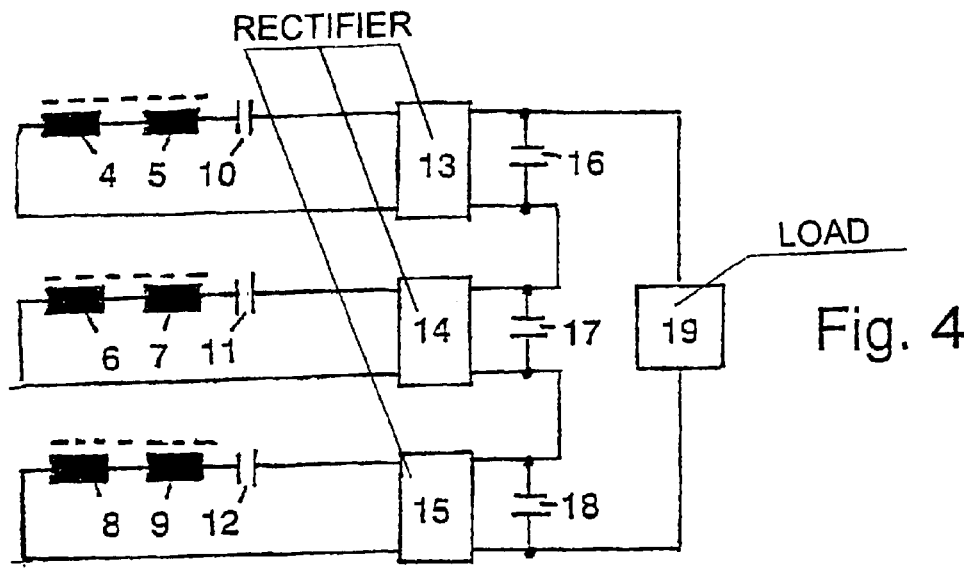
FIG. 4 is a block and schematic circuit diagram of a first embodiment of a configuration for producing electrical power from a magnetic field according to the invention.

FIG. 4 shows a first embodiment of a configuration for producing electrical power from a magnetic field. In this case, by way of example, an embodiment of the three-dimensional winding configuration as shown in FIG. 1 is assumed, although implementation of the other embodiments of the winding configurations as shown in FIGS. 2 and 3 is likewise feasible. A rectifier 13 can be seen, whose AC connections are connected to a series circuit formed by the two windings 4, 5 with a resonant capacitor 10 (series resonant circuits). In the same way, the AC connections of a rectifier 14 are connected to the series circuit formed by the two windings 6, 7 with a resonant capacitor 11 and, the AC connections of a rectifier 15 are connected to the series circuit formed by the two windings 8, 9 with a resonant capacitor 12. The rectifiers 13, 14, 15 are each in the form of bridge circuits, using four semiconductor components (bridge rectifiers). An energy-storage capacitor 16, 17, 18, is disposed respectively between the DC connections of each rectifier 13, 14, 15. The DC connections of all the rectifiers are connected in series with a load 19 (sensor measurement unit and sensor electronics).

Figure 5:
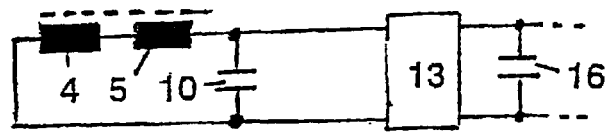
FIG. 5 is a fragmentary, block and schematic circuit diagram of a second embodiment of the configuration for producing electrical power from a magnetic field of FIG. 4.

FIG. 5 shows a second embodiment of a configuration for producing electrical power from a magnetic field. In such a case, the resonant capacitor 10 is disposed in parallel with the series circuit formed by the windings 4, 5 between the AC connections of the rectifier 13. The further resonant capacitors 11 and 12, respectively, are connected in the same way to the windings 6, 7 and 8, 9, respectively, to form parallel resonant circuits.

Figure 6:
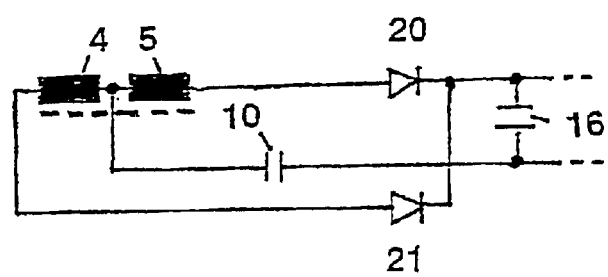
FIG. 6 is a fragmentary, block and schematic circuit diagram of a third embodiment of the configuration for producing electrical power from a magnetic field of FIG. 4.

FIG. 6 shows a third embodiment of a configuration for producing electrical power from a magnetic field, which can be used in particular for the embodiment of a three-dimensional winding configuration as shown in FIG. 1 and having two windings on each limb of the core, and leads to a simplification of the rectifier. The rectifier is, in such case, in the form of a center-tapped circuit (also referred to as a center tapped or center-tap connection), using two diodes 20, 21.

Figure 7:
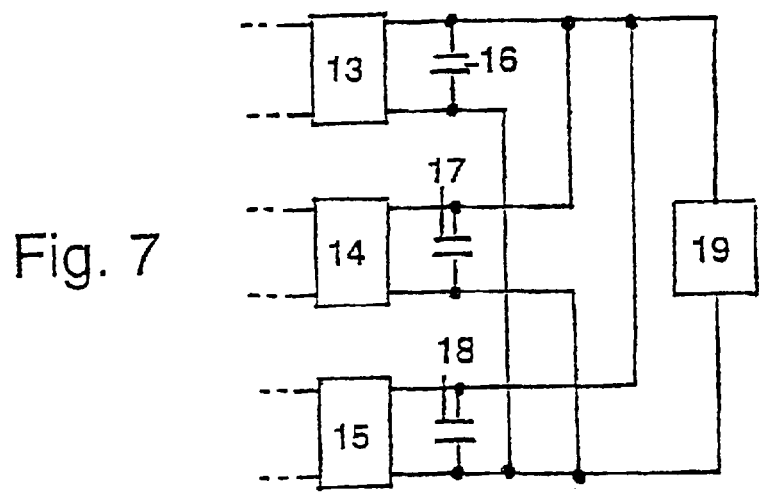
FIG. 7 is a fragmentary, block and schematic circuit diagram of a fourth embodiment of the configuration for producing electrical power from a magnetic field of FIG. 4.

FIG. 7 shows a fourth embodiment of a configuration for producing electrical power from a magnetic field. In FIG. 7, the electrical connection between the load 19 and the three rectifiers 13, 14, 15 may also be in the form of a parallel circuit formed by the DC connections of the rectifiers. Both a series circuit formed by the DC connections of the rectifiers and a parallel circuit formed by the DC connections of the rectifiers as well as a center-tap circuit as shown in FIG. 6 are, of course, feasible.

Figure 8:
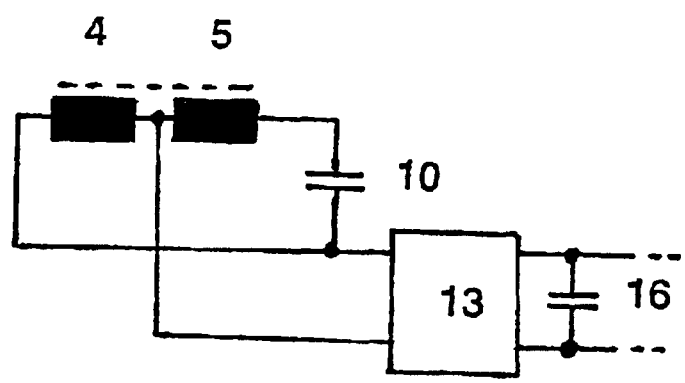
FIG. 8 is a fragmentary, block and schematic circuit diagram of a fifth embodiment of the configuration for producing electrical power from a magnetic field of FIG. 4.

FIG. 8 shows a fifth embodiment of a configuration for producing electrical power from a magnetic field. In FIG. 8, the tap between the windings 4, 5 can also be used for operation as a transformer to change the output voltage to an adequate level. In such a case, the resonant capacitor 10 may also be connected to the tap, and the rectifier 13 may be connected to the end connection. Furthermore, it is also possible to use two DC-isolated windings (as in the case of a conventional transformer).

We claim:

1. A configuration for producing electrical power from a magnetic field, comprising:
a three-dimensional winding configuration having:
a central core of a magnetic material;
at least three windings fitted on said central core, said at least three windings having three winding axes disposed at right angles to one another and intersecting at a common point;
at least three rectifiers each respectively connected to one of said at least three windings; and
at least three resonant capacitors each respectively connected to one of said at least three windings to form a resonant circuit, forming at least three resonant circuits, said at least three resonant circuits being connected in series with a load.

2. The configuration according to claim 1, wherein said at least three resonant capacitors are each respectively connected to one of said at least three windings to form a series resonant circuit.

3. The configuration according to claim 1, wherein said at least three resonant capacitors are each respectively connected to one of said at least three windings to form a parallel resonant circuit.

4. The configuration according to claim 1, wherein:
said rectifiers each have DC connections; and
said DC connections of said rectifiers are connected in series.

5. The configuration according to claim 1, wherein:
said rectifiers each have DC connections; and
said DC connections of said rectifiers are connected in parallel.

6. The configuration according to claim 1, wherein said windings are transformer windings.

7. The configuration according to claim 1, wherein said central core is a cubic core.

8. The configuration according to claim 7, wherein said cubic core has slots holding said windings.

9. The configuration according to claim 1, wherein said central core is a spherical core.

10. The configuration according to claim 9, wherein said spherical core has slots holding said windings.

11. The configuration according to claim 1, wherein:
said central core has three limbs each disposed at right angles with respect to one another; and
at least one of said windings is fitted on each of said three limbs.

12. The configuration according to claim 11, wherein:
said three limbs have longitudinal axes;
said longitudinal axes intersect at a central point in said central core; and
two of said windings are fitted symmetrically with respect to said central point on each of said three limbs.

13. A configuration for producing electrical power from a magnetic field, comprising:
a three-dimensional winding configuration having:
a central core of a magnetic material;
three windings fitted on said central core, said three windings having three winding axes disposed at right angles to one another and intersecting at a common point;
three rectifiers each respectively connected to one of said three windings; and
three resonant capacitors each respectively connected to one of said three windings to form a resonant circuit, forming at least three resonant circuits, said at least three resonant circuits being connected in series with a load.

14. The configuration according to claim 1, wherein every one of said at least three resonant circuits is connected in series with the load.

15. The configuration according to claim 13, wherein every one of said at least three resonant circuits is connected in series with the load.

* * * * *